(12) United States Patent
Kerkhoff

(10) Patent No.: US 6,746,179 B1
(45) Date of Patent: Jun. 8, 2004

(54) SYSTEM COMPONENT, SYSTEM AND METHOD FOR AERATING OF COMPOST AND THE DRAINING OF EXCESS LIQUID CONTAINED THEREIN

(76) Inventor: Dirk M. Kerkhoff, 9962 Chapman Road, Rosedale, B.C. (CA), V0X 1X0

( * ) Notice: Subject to any disclaimer, the term of this patent is extended or adjusted under 35 U.S.C. 154(b) by 0 days.

(21) Appl. No.: 10/084,734

(22) Filed: Feb. 26, 2002

(51) Int. Cl.[7] .............................. E02B 11/00; E01F 5/00
(52) U.S. Cl. .............................. 405/45; 405/41; 405/43; 404/2
(58) Field of Search .............................. 405/43, 44, 45, 405/47, 48, 49, 50, 51; 404/2, 4

(56) References Cited

U.S. PATENT DOCUMENTS

| | | | |
|---|---|---|---|
| 3,714,786 A | 2/1973 | Evans et al. | 61/11 |
| 3,815,213 A | * 6/1974 | Evans et al. | 29/446 |
| 3,898,778 A | 8/1975 | Erickson et al. | 52/169 |
| 4,365,911 A | * 12/1982 | Rossberg | 405/43 |
| 4,374,078 A | 2/1983 | Richardson | 264/35 |
| 4,490,067 A | * 12/1984 | Dahowski | 405/43 |
| 4,838,727 A | 6/1989 | Capuano | 404/2 |
| 5,316,410 A | 5/1994 | Blume | 405/45 |
| 5,380,121 A | * 1/1995 | Schluter | 404/14 |
| 5,564,857 A | * 10/1996 | Schluter | 405/36 |
| 5,908,266 A | * 6/1999 | Miller | 405/41 |

* cited by examiner

*Primary Examiner*—Frederick L. Lagman
(74) *Attorney, Agent, or Firm*—Richard L. Miller

(57) ABSTRACT

A system component, method of using, manufacturing and installing such, which facilities both the aerating of compost and the draining of liquid formed therein, utilizing a Especially formed component having an extruded longitudinal projection with a surface in which holes may be formed therein after embedding, in a concrete floor, with the surface and holes substantially level in the concrete floor so that fluids may readily either enter or exit through the holes in the component. When connected to an appropriate collection of peripheral supporting equipment, accordingly a set of such components can be utilized to create an efficient composting facility which permits fluids, typically air, to be easily forced into or out from compost residing thereon and excess effluent, typically liquid, which may be contained within the composting material to easily drain therefrom.

21 Claims, 1 Drawing Sheet

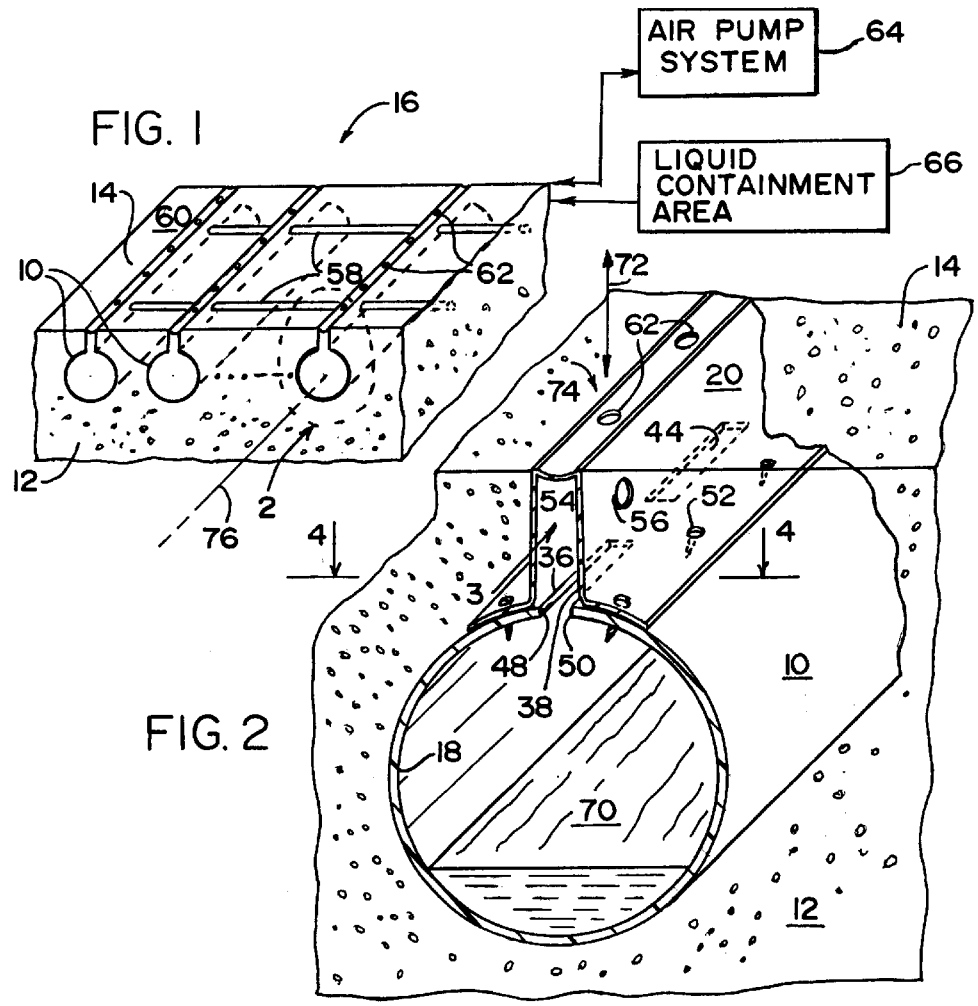
FIG. 1
FIG. 2
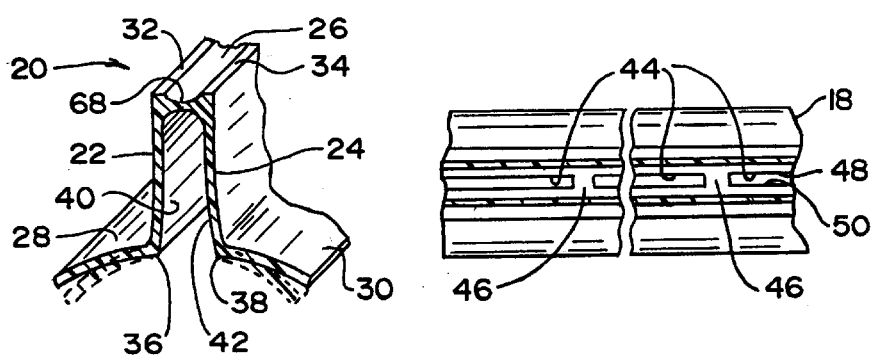
FIG. 3
FIG. 4

SYSTEM COMPONENT, SYSTEM AND METHOD FOR AERATING OF COMPOST AND THE DRAINING OF EXCESS LIQUID CONTAINED THEREIN

BACKGROUND OF THE INVENTION

1. Field of the Invention

The present invention relates to systems for aerating of compost and draining of excess liquid which may be contained therein.

2. Description of the Prior Art

Numerous innovations for draining liquids in various installations have been provided in the prior art that will be described. Even though these innovations may be suitable for the specific individual purposes to which they address, accordingly they differ from the present invention.

A FIRST EXAMPLE, U.S. Pat. No. 3,714,786 to Evans et al. teaches an open slot culvert for positioning in a drainage area with the open slot at the top so that any surface drainage water will flow through the slot and directly into the culvert, including a method and apparatus for its manufacture. The improved open slot culvert comprises a metallic, pipe section, split longitudinally along its upper side to form a narrow slot, and grate means, including two spaced, vertical bearing members joined by spacer means, secured in the slot. The method of making the improved open slot culvert includes the steps of providing two elongated, parallel, vertical members in spaced relation having a plurality of spacer means therebetween, longitudinally splitting the upper side of a metallic pipe section to form a narrow slot, and properly positioning the grate means within the narrow slot. The apparatus for making the improved open slot culvert generally comprises an entry pipe station, a pipe clamp, saw and tack welding station, and a finish welding and exit station.

A SECOND EXAMPLE, U.S. Pat. No. 3,898,778 to Erickson et al. teaches an improved method for cast-in-place construction of a concrete drainage conduit immediately below an integral concrete floor surface, including floor surface, including a longitudinal slot for discharge of surface fluids into said conduit. A water-inflated, fabric-reinforced plastic tubular form and longitudinal slot-forming inserts, used during the concrete pouring operations, are later retrieved at one end of the conduit for reuse following deflation of the tubular form. Conduits of non-circular cross section may be formed if desired. This improved method is useful for construction of drainage facilities for flushable slotted floors for cattle confinement feedlots and for other paved surface such as auto parking areas, roadway and airports.

A THIRD EXAMPLE, U.S. Pat. No. 4,374,078 to Richardson teaches in order in a floor drainage trough installation substantially to prevent gaps between the upper edge portions of the side walls of the floor drainage trough and the body of concrete in which the trough is set, such gaps resulting from shrinkage of the concrete as the body of concrete is cured, strips of woven glass fiber material are provided in the upper edge portions of the side walls of the trough during the molding thereof, with closely spaced loops of the glass fiber material of which the strips are formed being coated with the plastics material of which the trough is formed during the molding of the trough and outwardly projecting under the influence of the inherent resiliency thereof by removing the trough from the mold prior to the plastics material becoming fully set. The loops are securely embedded in the body of concrete, so that during the curing of the body of concrete the shrinkage thereof causes slight splaying apart of the upper edge portions of the side walls of the trough, thereby preventing formation of the above-mentioned gaps.

A FOURTH EXAMPLE, U.S. Pat. No. 4,838,727 to Capuano teaches a one-piece slotted conduit having a thin inner body section and an encompassing frame structure. The encompassing frame structure having specially designed recesses formed in it to ensure maximum conduit strength and an economic use of material. The slotted conduit also including male/female interconnecting ends which ensure easy and accurate alignment of a plurality of conduits in an interconnected system.

A FIFTH EXAMPLE, U.S. Pat. No. 5,316,410 to Blume teaches this invention relates to the draining of foundations by using an elongate subterranean drainage structure located approximately horizontally and parallel to the foundation in combination with a plurality of elongate upwardly extending hollow drain structures extending from the structure toward the surface of the earth. Hydrostatic pressure of water in the soil forces water through holes in the upwardly extending drain structures. The water then passes rapidly to the bottom of the upwardly extending drain structures by the force of gravity and thereupon into the horizontal drain structure wherein it is carried away from the foundation.

SUMMARY OF THE INVENTION

AN OBJECT of the present invention is to provide a system component, a system, and a method which facilitates both the aerating of compost and the draining of excess liquid which may be contained therein that avoids the disadvantages of the prior art.

ANOTHER OBJECT of the present invention is to provide a system component and a system which facilitates both the aerating of compost and the draining of excess liquid which may be contained therein that is simple and inexpensive to manufacture.

STILL ANOTHER OBJECT of the present invention is to provide a system component, a system, and a method which facilitates both the aerating of compost and the draining of excess liquid which may be contained therein that is simple to use and easily implemented.

BRIEFLY STATED, STILL YET ANOTHER OBJECT of the present invention is to provide a system component which facilitates both the aerating of compost and the draining of excess liquid which may be contained therein, which is a specially formed component having an extruded longitudinal projection with a surface in which holes may be formed therein after embedding, in a concrete floor, with the surface and holes substantially level in the concrete floor so that fluids may readily either enter or exit through the holes in the component. When connected to an appropriate collection of peripheral supporting equipment, accordingly a set of such components can be utilized to create an efficient composting facility which permits fluids, typically air, to be easily, forced into or extracted from compost, residing thereon and excess effluent, typically liquid, contained within the composting material to easily drain therefrom. A composting slab formed utilizing a set of such components has the additional advantages of being substantially flat without any spigots, spouts, sprayheads, valves or other projections extending therefrom, which otherwise could be accidentally broken off, caught on machinery and people, and be responsible for a host of inadvertent associated accidents.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 1 is a diagrammatic perspective view, with parts broken away and partially in section, illustrating the present invention installed in a floor of a typical composting area;

FIG. 2 is an enlarged diagrammatic view of the area enclosed by the dotted curve indicated by arrow 2 in FIG. 1;

FIG. 3 is an enlarged diagrammatic perspective view, with parts broken away, of the aerating and draining channel component taken in the direction of arrow 3 in FIG. 2; and FIG. 4 is a diagrammatic cross sectional view, with parts broken away, taken on line 4—4 of FIG. 2.

A MARSHALLING OF REFERENCE NUMERALS UTILIZED IN THE DRAWING 10 aerating and draining component of the present invention
12 concrete
14 floor
16 composting area
18 cooperating pipe
20 fluid transfer interface element
22 side wall
24 side wall
26 short bridge element
28 flexible curved cylindrical section
30 flexible curved cylindrical section
32 upper first edges
34 upper first edges
36 lower second edges
38 lower second edges
40 inner surfaces of the side wall 22
42 inner surfaces of the side wall 24
44 series of slotted openings
46 short connecting portion
48 opposite edges of the slots
50 opposite edges of the slots
52 attaching mechanism can be self tapping screws, rivets, cement, thermal bonding, chemical bonding or any other appropriate securement
54 space between side walls 22 and 24
56 plurality transverse through bores
58 plurality of lengths of rebar
60 surface of floor 14
62 plurality of appropriate holes are drilled at appropriate intervals along each length of the short bridge elements 26
64 air pump system
66 liquid containment area
68 depressed dimpled groove
70 liquid effluent
72 air, indicated by arrow
74 liquid to drain back through bores 62, indicated by arrow
76 axis of the fluid transfer interface element 20

DESCRIPTION OF THE PREFERRED EMBODIMENT

Referring now to the figures, in which like numerals indicate like parts, and particularly to FIGS. 1 and 2, is seen diagrammatic perspective views, with parts broken away and partially in section, of the aerating and draining component 10 of the present invention which is formed by attaching a fluid transfer interface element 20 to a cooperating pipe 18 which accordingly is appropriately installed in a concrete 12 floor 14 of a typical composting area 16.

As best seen in FIG. 3 the fluid transfer interface element 20 has two side walls 22 and 24 joined together at their upper first edges 32 and 34 by a short bridge element 26. Two identical flexible curved cylindrical sections 28 and 30 are integrally formed and attached respectively to lower second edges 38 and 38 of the two side walls 22 and 24. The inner surfaces 40 and 42 of the side walls 22 and 24 are not parallel to each other, but accordingly are intentionally formed somewhat further apart at their lower second edges 38 and 38 than at their upper first edges 32 and 34, so as to help prevent material from clogging the space 54 between side walls 22 and 24.

The two identical flexible curved cylindrical sections 28 and 30 are utilized to attach the fluid transfer interface element 20 to a cooperating pipe 18 typically which may have a cross sectional circular diameter in the range of 4 to 8 inches. Along the length of the cooperating pipe 18 is formed a series of slotted openings 44 typically about 36 inches long which are separated from each other end from end approximately 4 inches, by a short connecting portion 46 which maintains the integrity of the cooperating pipe 18. The two identical flexible curved cylindrical sections 28 and 30 may be formed with an appropriate radius of curvature so as to substantially match the diameter of a particular cooperating pipe 18. An excellent fit between the curved cylindrical sections 28 and 30 and the cooperating pipe 18 may be had and is accordingly facilitated because the curved cylindrical sections 28 and 30 are somewhat flexible.

In order to form a length of the aerating and draining component 10, a suitable attaching mechanism 52 is utilized to attach, a length of the fluid transfer interface element 20, to a length of the cooperating pipe 18 with the series of slotted openings 44 directly below the short bridge element 26 with the opposite edges 48 and 50 of the slotted openings 44 placed adjacent to the lower second edges 36 and 38 respectively. Accordingly fluids may easily pass from the space 54 through the slotted openings 44 and into the cooperating pipe 18. Both the fluid transfer interface element 20 and the cooperating pipe 18 may be fabricated from suitable plastic material typically PVC (polyvinyl chloride).

The attaching mechanism 52 can be self tapping screws, rivets, cement, thermal bonding, chemical bonding or, any other appropriate securement techniques well known in the art.

Having described the structure of aerating and draining component 10 of the present invention, it is now appropriate to explain how the component is installed in a typical concrete slab to be utilized for processing material to be composted.

As best seen in FIGS. 1 and 2 a plurality of transverse through bores 56 are formed, through the side walls 22, and 24 substantially perpendicular to an axis 76 of the fluid transfer interface element 20, so that a plurality of lengths of rebar 58 can be inserted therein and accordingly utilized as a holding and reinforcing component, for a set, of the aerating and draining component. 10 at a correct elevation within a concrete slab which is then appropriately poured about and around the set of the aerating and draining components, 10 so as to form a floor 14 with the upper first edges 32 and 34 of the short bridge elements 26 being maintained even with the surface 60 of floor 14. After the concrete has hardened a plurality of appropriate holes 62 are drilled, in appropriate sizes, at appropriate intervals along each length of the short bridge elements 26. Naturally the ends of the aerating and draining component 10 or appropriately plugged or covered and all required plumbing is installed below the surface 60 of concrete 12 floor 14 as is required so as to fluidly connect the set of the aerating and draining components 10 to an air pump system 64 and liquid containment area 66.

When material to be composted is placed on the surface 60 of the floor 14 so just described the composting process can be made more efficient by aerating the material in accordance with a particular schedule for a particular material. The aerating is accordingly accomplished by pumping air, indicated by arrow 72, through the cooperating pipe 18 through bores 62 which have been drilled into the short bridge elements 26 and into or out of the compost which resides upon the floor 14. The composting of material may cause large amounts of excess liquid effluent 70 to be discharged therefrom. Accordingly, in conformance with a particular schedule for a particular material, the same set of aerating and draining components 10 are utilized to facilitate the removal of effluent 70 by allowing the liquid to drain back through bores 62, indicated by arrow 74, and into an appropriate liquid containment area 66. A depressed dimpled groove 68 helps facilitate an effluent runoff path to enter the through bores 62.

It will be understood that each of the elements described above, or two or more together, may also find a useful application in other types of constructions differing from the types described above.

While the invention has been illustrated and described as embodiments of, system components, and a system and method for the aerating of compost and the draining of liquid contained therein, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An aerating and draining component for embedding in a concrete slab comprising:
   a) fluid transfer interface element, having two side walls;
   b) a cooperating pipe; and
   c) a means for attaching said fluid transfer interface element to said cooperating pipe, wherein each of said two side walls, each have, a plurality of transverse through bores formed there through substantially perpendicular to an axis of the fluid transfer interface element, so that a plurality of lengths of rebar can be inserted therein and accordingly utilized as a holding and reinforcing component.

2. The aerating and draining component as defined in claim 1, wherein each of said two side walls, each have an upper first edge, joined together by a short bridge element.

3. The aerating and draining component as defined in claim 2, wherein said short bridge element has a depressed dimpled groove, so as to facilitate an effluent runoff path to enter any through bores therein.

4. The aerating and draining component as defined in claim 1, wherein each of said two side walls, each have a lower second edge, integrally formed and attached to a flexible curved cylindrical section.

5. The aerating and draining component as defined in claim 1, wherein each of said two side walls, each have, an upper first edge and a lower second edge, wherein an inner surface of each of said side walls are not parallel to each other but accordingly are further apart at their lower second edges than at their upper first edges, so as to help prevent material from clogging a space between said side walls.

6. The aerating and draining component as defined in claim 1, wherein said cooperating pipe is circular in cross section, and cooperates with a flexible curved cylindrical section having a substantially matching radius of curvature, integrally formed and attached to a lower second edge of one of said two side walls.

7. The aerating and draining component as defined in claim 1, wherein said cooperating pipe has longitudinally formed a series of slotted openings, which are separated from each other end from end by a short connecting portion so as to maintain an integrity of said cooperating pipe.

8. The aerating and draining component as defined in claim 1, wherein said means for attaching said fluid transfer interface element to said cooperating pipe is self tapping screws.

9. The aerating and draining component as defined in claim 1, wherein said means for attaching said fluid transfer interface element to said cooperating pipe is screws.

10. The aerating and draining component as defined in claim 1, wherein said means for attaching said fluid transfer interface element to said cooperating pipe is rivets.

11. The aerating and draining component as defined in claim 1, wherein said means for attaching said fluid transfer interface element to said cooperating pipe is cement.

12. The aerating and draining component as defined in claim 1, wherein said means for attaching said fluid transfer interface element to said cooperating pipe is thermal bonding.

13. The aerating and draining component as defined in claim 1, wherein said means for attaching said fluid transfer interface element to said cooperating pipe is chemical bonding.

14. An aerating and draining component for embedding in a concrete slab comprising:
   a) fluid transfer interface element, having two side walls;
   b) a cooperating pipe; and
   c) means for attaching said fluid transfer interface element to said cooperating pipe, wherein each of said two side walls, each have an upper first edge, joined together by a short bridge element, wherein said short bridge element has a depressed dimpled groove, so as to facilitate an effluent runoff path to enter any through bores therein, wherein each of said two side walls, each have a lower second edge, integrally formed and attached to a flexible curved cylindrical section, wherein an inner surface of each of said side walls are not parallel to each other but accordingly are further apart at their lower second edges than at their upper first edges, so as to help prevent material from clogging a space between said side walls wherein each of said two side walls, each have, a plurality of transverse through bores formed there through substantially perpendicular to an axis of the fluid transfer interface element, so that a plurality of lengths of rebar can be inserted therein and accordingly utilized as a holding and reinforcing component, wherein said cooperating pipe is circular in cross section, and cooperates with a flexible curved cylindrical section having a substantially matching radius of curvature, integrally formed and attached to a lower second edge of one of said two side walls, wherein said cooperating pipe has longitudinally formed a series of slotted openings, which are separated from each other end from end by a short connecting portion so as to maintain an integrity of said cooperating pipe.

15. The aerating and draining component as defined in claim 14, wherein said means for attaching said fluid transfer interface element to said cooperating pipe is self tapping screws.

16. The aerating and draining component as defined in claim 14, wherein said means for attaching said fluid transfer interface element to said cooperating pipe is screws.

17. The aerating and draining component as defined in claim 14, wherein said means for attaching said fluid transfer interface element to said cooperating pipe is rivets.

18. The aerating and draining component as defined in claim 14, wherein said means for attaching said fluid transfer interface element to said cooperating pipe is cement.

19. The aerating and draining component as defined in claim 14, wherein said means for attaching said fluid transfer interface element to said cooperating pipe is thermal bonding.

20. The aerating and draining component as defined in claim 14, wherein said means for attaching said fluid transfer interface element to said cooperating pipe is chemical bonding.

21. A method of installing an aerating and draining component comprising the steps of:

a) inserting a plurality of lengths of rebar through transverse through bores formed in the side walls of at least one fluid transfer interface element of said aerating and draining component;

b) maintaining upper first edges of at least one of a a short bridge element, of said at least one fluid transfer interface element, at a correct elevation so as to be even with the surface of a concrete slab to be poured;

c) plugging all open ends of said aerating and draining components so as to prevent any concrete from entering;

d) installing required plumbing;

e) pouring said concrete slab so as to be even with said upper first edges of at least one said short bridge element;

f) allowing said concrete to harden; and g) drilling holes at appropriate intervals, of appropriate sizes, along a length of at least one said short bridge element in conformance with a particular schedule as required for composting a particular material.

\* \* \* \* \*